Patented Jan. 4, 1927.

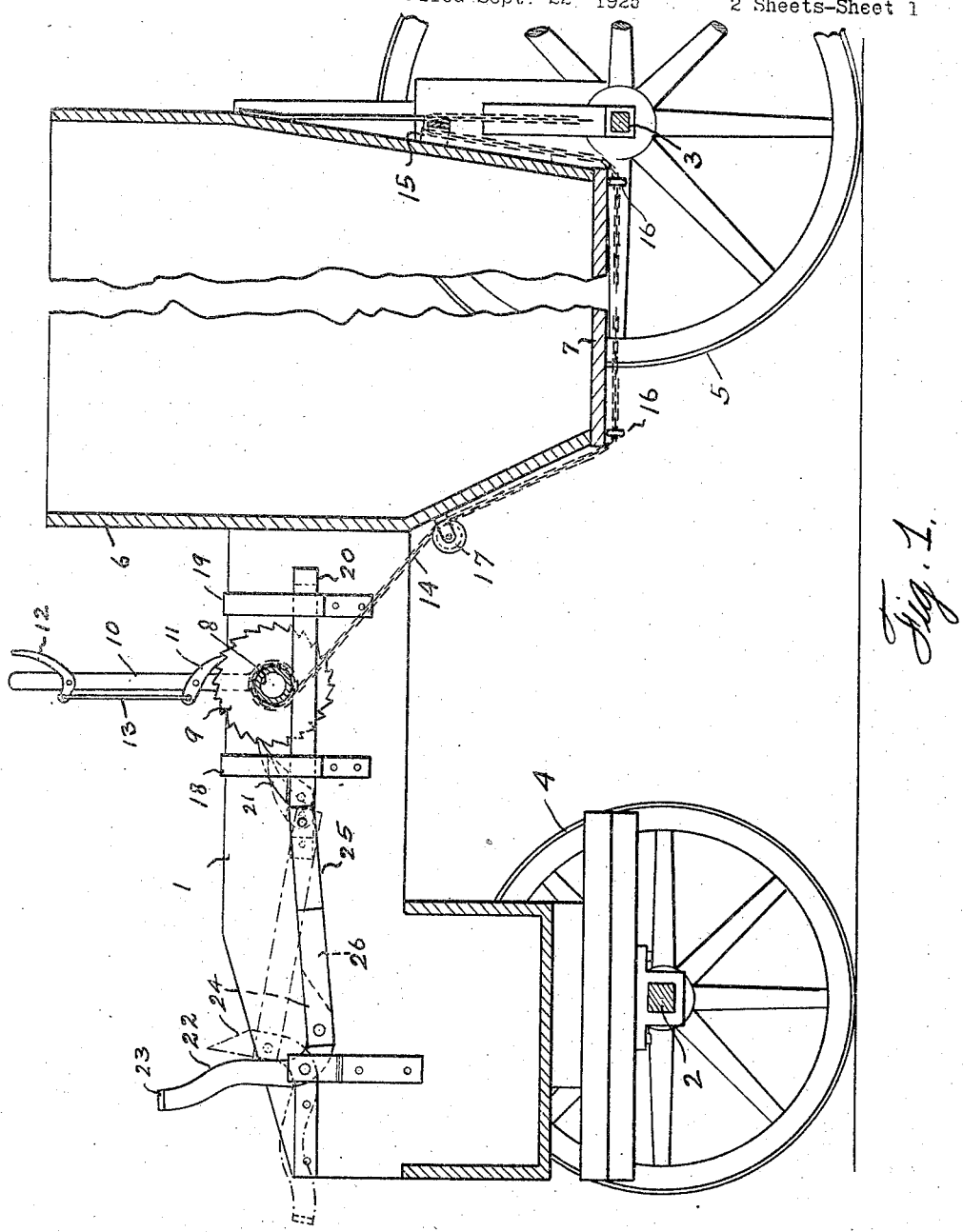

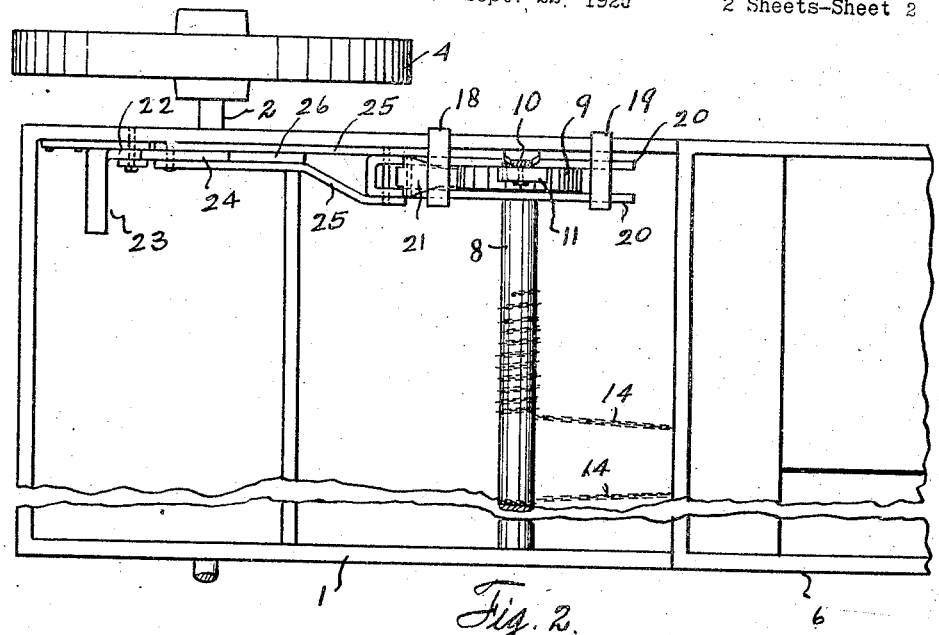
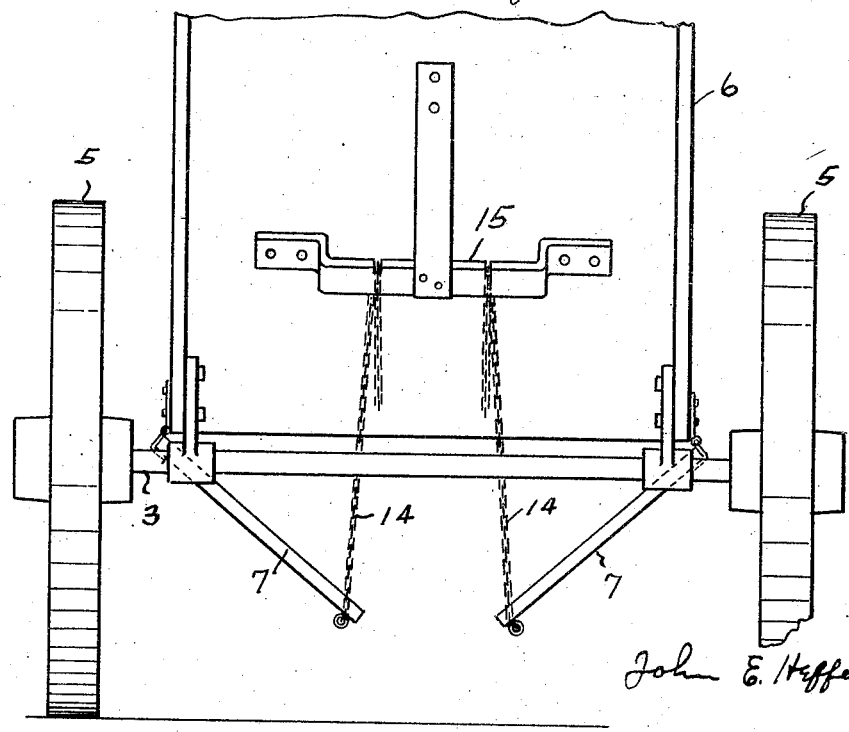

1,613,458

UNITED STATES PATENT OFFICE.

JOHN E. HEFFERNAN, OF HOUSTON, TEXAS, ASSIGNOR TO T. L. SMITH, JR., OF HARRIS COUNTY, TEXAS.

LOAD-HANDLING APPARATUS.

Application filed September 22, 1925. Serial No. 57,816.

This invention relates to new and useful improvements in a dump wagon.

One object of the invention is to provide, in a load carrying vehicle, a novel means for controlling the discharge of the load therefrom; and while said load controlling means is specially applicable to a dump wagon, or vehicle, it is also capable of general application for the purpose of handling loads.

With the above and other objects in view this invention has particular relation to certain novel features of construction, operation, and arrangement of parts, an example of which is given in this specification and illustrated in the accompanying drawings, wherein:—

Figure 1 shows a longitudinal vertical sectional view of a dump wagon, with the load controlling means applied thereto.

Figure 2 shows a fragmentary plan view thereof, and

Figure 3 shows a fragmentary rear end view.

Referring now more particularly to the drawings, wherein like numerals of reference designate similar parts in each of the figures the numeral 1 designates the framework of the vehicle, as a whole, which is mounted on the front and rear axles 2 and 3, which in turn are supported by the front and rear wheels 4 and 5.

Supported by the frame work, and located preferably just in front of the rear axle 3 there is a body 6 whose bottom is formed of the downwardly and outwardly swinging doors 7, 7, which are hinged to the body.

Rotatably mounted in front of the body there is a transverse drum 8 fixed to one end of which there is a ratchet wheel 9. Pivoted to the adjacent side of the framework there is a hand lever 10 equipped with a pivoted dog 11, adapted to engage said ratchet wheel 9 to hold the drum against rotation.

The upper end of the lever 10 has a pivotally mounted grip lever 12 which is connected to the dog 11 through a rod 13. Through this mechanism the dog 11 may be released from the ratchet 9 for the purpose hereinafter stated. Chains 14, 14, are engaged at one end, to the bracket 15, carried by the rear end of the body and these chains pass through the front and rear U-bolts 16, 16, carried by the free edges of the doors 7, underneath, and the other ends of these chains are wound around the drum 8, working over the sheaves as 17 fastened to the front side of the body.

Arranged in front and rear of the ratchet and secured to the adjacent side member of the framework 1 are the brackets 18 and 19 and slidably mounted in these brackets are the bars 20, 20, which are arranged, one on each side of the ratchet wheel 9 forming an anchor. Pivoted between the forward ends of these bars there is a dog 21 adapted to engage said ratchet wheel to hold the drum 8 against rotation thus preventing the unwinding of the chains 14 and the release of the load. There is a foot lever 22 pivoted to said side member of the framework, near its front end whose free end is overturned laterally forming the pedal 23, and the other, or pivoted end of this foot lever has a rearward, upwardly beveled, extension 24 adapted to work between the spaced links 25, 25 between the forward ends of which said extension is pivoted. The other ends of these links are pivoted to the forward ends of the respective bars 20, 20. Between the links 25, 25, there is secured a stop 26.

As shown in Figure 1 the lever 22 is in vertical position with the extension 24 resting against the stop 26 and with the dog 21 engaging the ratchet 9. In this position the pivotal connection between the extension 24 and the links 25 will be beneath the pivot on which the lever 22 operates. If it be now desired to dump the load the dog 11 is first released and the lever 10 moved rearwardly and said dog 11 again engaged with said ratchet wheel. The lever 22 may be now moved forwardly carrying the forward ends of the links 25 upwardly past center and above the pivotal connection of said lever 22, said links 25 and bars 20 moving forwardy when the center is passed and assuming the position as indicated in dotted lines in Figure 1. The load will now swing the doors 7 open the operator holding the lever 10, if desirable, to prevent the sudden opening of doors 7. If it be desired to dump the entire load at one place the doors may be permitted to swing entirely open for that purpose, but if it be desired to scatter the load the operator, by controlling the lever 10, may permit only a partial opening of said doors and by a foot manipulation may swing said lever 22 back into vertical position carrying the dog 21 again into engagement with the ratchet wheel 9 and thus holding the doors 7 only partly open to permit the gradual discharge of the load as the vehicle moves along.

When the load has been dumped, or discharged, the doors may be closed by the manipulation of the lever 10, back and forth, which will cause a rotation of the drum 8, through the dog 11 and the chains 14 will thus be wound up effecting the closing of said doors.

What I claim is:

1. In a load handling apparatus a rotatable member, a ratchet carried by said rotatable member, a shiftable anchor associated with said ratchet, a dog carried by said anchor and adapted to engage and release said ratchet, a pivoted foot lever whose lower end is formed with an extension, a link pivoted at one end to said anchor and at the other end to said extension, said extension and link forming a toggle joint through which said dog may be actuated into engagement with and released from said ratchet, and a stop carried by said link and disposed to engage said extension to hold said dog in engaged position with the ratchet.

2. In a load handling apparatus a rotatable member, a ratchet carried by said rotatable member, a slidable anchor associated with said ratchet, a dog carried by said anchor means for shifting said anchor to effect the engagement of the dog with, and its release from, said ratchet, said shifting means including a foot lever pivoted at one end to a fixed anchor and whose pivoted end has a rearward extension, spaced links whose forward ends are pivoted to and arranged on opposite sides of said extension, the other ends of said links being pivoted to said slidable anchor, a stop secured between said links against which the extension engages when said foot lever is in upright position to retain the dog in engagement with said ratchet.

3. In a load handling apparatus, a rotatable member, a ratchet carried by said rotatable member, a slidable anchor associated with the ratchet, a dog carried by said anchor, means for shifting said anchor to effect the engagement of the dog with and its release from said ratchet, said anchor being formed of spaced bars one arranged on each side of said ratchet, said dog being pivoted between the forward ends of said bars, an upstanding foot lever pivoted to the fixed anchor and whose pivoted end is rearwardly turned, a pair of spaced links pivoted at their rear ends to said respective bars and their forward ends embracing and being pivoted to said extension, and a stop between said links against which said extension is adapted to engage to return said dog in engagement with said ratchet.

In testimony whereof I have signed my name to this specification.

JOHN E. HEFFERNAN.